2,853,471
Patented Sept. 23, 1958

2,853,471

MAKING ADDITION POLYMERS AND COPOLYMERS WITH PHOSPHORUS COMPOUND EMULSIFIER

Donald A. Beadell, Cranford, N. J., assignor to General Aniline & Film Corporation, New York, N. Y., a corporation of Delaware No Drawing. Application November 29, 1955
Serial No. 549,881

6 Claims. (Cl. 260—63)

The present invention relates to the manufacture of improved polymeric and copolymeric materials, and in particular to the preparation of such materials by emulsion polymerization.

It is known that polymers of unsaturated compounds containing the characteristic active group $>C=C<$ and copolymers of butadiene, isoprene, and 2-chlorobutadiene, 1,3 etc. with polymerizable monomers containing said active group may be readily prepared in aqueous media through the use of certain sulfur-containing anionic-surface active agents as primary emulsifiers. Emulsifiers of this type, such as, for example, organic sulfates and sulfonates while yielding good polymerization and copolymerization rates with fair latex stability have the disadvantage of accelerating the rate of discoloration by heat or light of the resulting polymer or copolymer.

It is also known that non-ionic surface active agents prepared by the addition of ethylene oxide to hydrophobic intermediates bearing labile hydrogens, such as long chain fatty acids, alkyl phenols, etc., when employed as emulsifiers in the emulsion polymerization process produce polymers and copolymers of good heat and light stability when substituted for the sulfur-containing emulsifiers. Such substitution in toto, however, has been shown to be impractical because the rates of conversion to polymer or copolymer are much too low and the physical stability of the resultant latex is not always satisfactory. Partial substitution of non-ionic for sulfate or sulfonate type of emulsifiers provides no significant improvement in color stability.

Attempts in the past to substitute phosphorus-containing surface active agents (surfactants) for sulfur-containing surfactants have been unsuccessful because of poor water solubility of the phosphates. For example, it has been found that alkyl sulfates such as those produced from fatty alcohols are excellent polymerization emulsifiers for many purposes while the equivalent alkyl phoshpate has little or no utility.

It is an object of the present invention to provide an improved process for producing polymer and copolymer latices by means of alkyl and aralkyl polyoxyethylene phosphates as emulsifiers with good rates of conversion and excellent latex stability. Another object is to produce such latices which possess superior color stability in the presence of light and heat.

Other objects and advantages will become manifest from the following description.

The above objects are accomplished by the employment, in any emulsion polymerization system, of an alkyl or aralkyl polyoxyethylene phosphate as an anionic surface active agent or emulsifier. By the presence of such an emulsifier in any polymerization or copolymerization emulsion system high conversion rates of polymer and copolymer latex are obtained with superior light and heat stability.

The alkyl and aralkyl polyoxyethylene phosphates employed in accordance with the present invention are characterized by the following formulae:

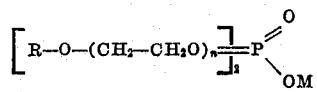

and

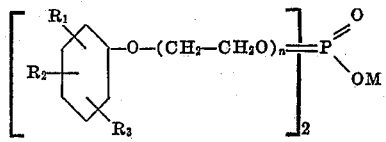

wherein R represents an alkyl radical containing from 8 to 27 carbon atoms, e. g., octyl, nonyl, decyl, hendecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, and heptacosyl radicals, $R_1$ represents an alkyl of 5 to 27 carbon atoms, e. g. pentyl, heptyl, hexyl, etc. higher alkyls of the same value as R, cycloalkyl, e. g. cyclopentyl, cyclohexyl, cycloheptyl, cyclooctyl, methylcyclopentyl, methylcyclohexyl, methylcyclooctyl, methylcyclobutyl, 1,1-dimethylcyclopropyl, ethylcyclopropyl, ethylcyclobutyl, 1-ethyl-2-methylcyclopropyl, 1,1,2-trimethylcyclopropyl, 1,2,3 - trimethylcyclopropyl, 1,1 - dimethylcyclopentyl, 1,2 - dimethylcyclopentyl, 1,3 - dimethylcyclopentyl, 1,2-dimethylcyclohexyl, 1,3-dimethylcyclohexyl, 1,4 - dimethylcyclohexyl, ethylcyclohexyl, ethylmethylcyclopentyl, 1,1,2 - trimethylcyclopentyl, cyclononyl, propylcyclohexyl, 1,2,4 - trimethylcyclohexyl, 1,3,5-trimethylcyclohexyl, 1 - isopropyl - 4 - methylcyclohexyl, 1,2,4,5-tetramethylcyclohexyl, and "keryl" radicals derived from mineral oils containing alkyl, cycloalkyl and mixed alkylcycloalkyl radicals having from 12 to 27 carbon atoms, $R_2$ and $R_3$ represent either hydrogen, alkyl of from 1 to 22 carbon atoms, e. g. methyl, ethyl, propyl, butyl, and the higher alkyls defined by R and cycloalkyls defined by $R_1$ or "keryl" radicals derived from mineral oils, $n$ represents the degree of oxyethylenation which ranges from 1 to 40 moles of ethylene oxide per mole of phenolic or straight or branched chain alcohol compounds, and M represents ammonium radical, an alkali metal such as sodium, potassium, lithium, mono, di, and trimethyl ammonium; mono, di, and tri-($\beta$-hydroxyethyl) ammonium; mono, di, and triisopropyl ammonium; alkylamine, e. g. propylamine; cyclohexylamine, abietyl amine, alkanol amine, e. g., propanol amine, ethanolamine; cyclohexanolamine, radical, etc. It is to be noted that the nature or character, i. e. aliphatic, aromatic or heterocyclic radical, of the amine salt forming organic compound is immaterial so long as it is capable of forming a monoester salt with the phosphate diesters employed herein.

The term "keryl" as employed herein and in the appended claims is a recognized term used in patent terminology to designate alkyl, cycloalkyl and mixed-cycloalkyl radicals derived from mineral oil. It is recognized by those skilled in the art that in the alkylation of a phenolic compound (by "phenolic compound" is meant an aromatic compound of the benzene or naphthalene series substituted in the ring by a hydroxyl group) with mineral oil one obtains a "keryl" phenol, i. e. a mixture of alkyl, cycloalkyl and mixed-alkylcycloalkyl phenols in which the alkyl chains may be either straight or branched, and the cycloalkyl chains may contain alkyl substituents, or the cycloalkyl group may be connected to the phenol by an alkylene bridge. In any event, the total number of carbon atoms in any of the phenol substituents ranges from 12 to 27 carbon atoms. Accordingly, therefore, the term "keryl" as used herein and in the appended claims designates any or all of the above alkyl, cycloalkyl and mixed alkylcycloalkyl groups. The term is derived from the word "kerosene" and is, in fact, equivalent to the radical formed by the removal of hydrogen from a kerosene component. The preparation of the polyoxyethylenated phenol, cresol and naphthol alkylates is well known to those skilled in the field of nonionic surfactants, and need not be described in detail herein. In general, the process involved consists of the addition of ethylene oxide to an alkylated phenolic compound which is generally made by the alkylation of phenolic compound with an olefin such as propylene, butylene, diisopropylene, triisopropylene, diisobutylene and the like, or any alkyl halide, such as a chlorinated mineral oil fraction.

The polyoxyethylenated straight and branched chain alcohols and the polyoxyethylenated phenolic alkylates characterized by the above general formulae, prior to phosphate ester formation, are prepared by the usual methods known to the art. Suitable methods for their preparation are described in United States Patents 1,970,578, 2,213,477, 2,575,832, 2,593,112, 2,676,975, and in application, Serial No. 466,241, filed on November 1, 1954, for Geoffrey R. Ward and entitled "Oxyethylenated Phenolic Alkylates As Textile Finishing Agents," the complete disclosures and teachings of which, including the said patents, are incorporated herein by reference.

The phosphate diesters of the foregoing polyoxyethylenated straight and branched chain alcohols and polyoxyethylenated alkyl phenolics are readily prepared by the usual esterification procedure while employing polyphosphoric acid, $P_2O_5 \cdot H_2O$ which is a partially dehydrated phosphoric acid at atmospheric pressure and at a temperature of about 115° C. for a period of four hours. The straight or branched chain alcohol, such as, for example oleoyl alcohol or an alkylated phenol may be heated with 1 to 40 moles of ethylene oxide with polyphosphoric acid, OH:P=2:1 or OH:P=3:1 for five hours at 115° C. The acid reaction mixture is then neutralized with sodium hydroxide solution, the water removed and the salt which precipitates, filtered off.

The alkyl and aralkyl polyoxyethylene phosphates may be employed not only in the polymerization of single polymerizable monomers, but also in the copolymerization of such monomers with other polymerizable monomers containing an unsaturated double bond or a vinyl group. Monomers which may be polymerized to yield latices of excellent color stability in the presence of light and heat are vinyl chloride, vinyl acetate, vinyl butyrate, vinyl propionate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid, vinyl aromatic compounds, for example, styrene orthochlorostyrene, parachlorostyrene, 2,5-dichlorostyrene, 2,4-dichlorostyrene, para-ethyl styrene, divinyl benzene, vinyl naphthalene; alpha-methyl styrene; dienes, such as butadiene, chloroprene; amides, such as acrylic acid amide, acrylic acid anilide; nitriles, such as acrylonitrile; esters of $\alpha,\beta$-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like.

Copolymers of butadiene with styrene, acrylic acid nitrile, methacrylic acid nitrile, acrylic and methacrylic acid esters, fumaric acid esters, unsaturated ketones, such as 1,1-dichloro-ethylene may also be prepared. Copolymers of butadiene, 2,3-dimethyl-1,3-butadiene, isoprene, piperylene, 3-furyl-1,3-butadiene, 3-methoxy - 1,3 - butadiene and the like with styrene, vinyl naphthalene and similar derivatives thereof; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc. of the types described, may be obtained by the emulsion polymerization process and the resulting latices possessing improved color stability in the presence of light and heat. In addition, to the conjugated butadienes, aryl olefins such as styrene, various alkyl styrenes, p-chloro styrene, p-methoxy styrene, vinyl naphthalene and similar derivatives thereof may be copolymerized with haloprenes, such as chloroprene, bromoprene, methyl chloroprene, and the like. It is generally preferred that the emulsion for the polymer or copolymer polymerization be of an "oil in water" type with the ratio of aqueous medium to monomeric material between about 1.5:1 and 2.75:1 in parts by weight. The ratio of aqueous medium to two or more monomeric materials may vary from 1:1 to 3:1.

Monomers may be mixed in proportions illustrated by the following examples:

(1) Butadiene—styrene systems may vary between twenty percent and eighty percent butadiene.

(2) Butadiene—acrylonitrile systems may vary between fifty percent and eighty percent butadiene.

(3) Mixtures of ethyl acrylate and methyl acrylate may be varied between sixty-six percent and ninety percent ethyl acrylate.

(4) Mixtures of methyl methacrylate and ethylacrylate may contain at least eighty percent methyl methacrylate.

The amount of emulsifier, i. e. polyoxyethylenated alcohol phosphate or polyoxyethylenated alkyl phenol phosphate is usually between 2 and 10 parts, preferably between 3 to 8 parts by weight per 100 parts by weight of monomer or a mixture of monomers. The polymerization may be effected in either a neuatral, alkaline or slightly acid medium, and may range from 6 to 10, preferably from 7 to 10. The pH may be varied by adjusting the emulsion to the desired value by the addition of sodium or potassium hydroxide, sodium acetate, hydrochloric acid, or the like.

The polymerization is catalyzed as usual with a compound or a mixture of compounds yielding oxygen with or without a mercaptan modifier. The catalyst may be any one of the inorganic persulfates, organic peroxides and the like which are normally employed in polymerization reactions and may range from 0.5 to 3% by weight of the monomer or mixtures of monomers. The temperature may range from 40° to 200° F. Pressure will depend upon the vapor pressure of the monomers used and the temperature required to produce acceptable rate with the chosen catalyst. Pressure may vary from atmospheric to one hundred pounds per square inch gauge.

The following examples will illustrate the manner in which the alkyl- and aralkyl-phenolic polyoxyethylene phosphates are employed as emulsifiers in polymerization and copolymerization reactions yielding excellent conversion rates and producing latices of exceptional stability in color to light and heat.

EXAMPLE I

Vinyl acetate, inhibited with hydroquinone, was distilled away from the inhibitor at a temperature of 72–73° C. in order to obtain inhibitor free vinyl acetate. This distillation was carried out using a Vigreaux column and a 1-liter round bottom flask equipped with a 24/40 ground glass joint.

Using the distilled, inhibitor-free vinyl acetate, the following materials were weighed into 16 standard coke bottles: 33% vinyl acetate, 5% emulsifier based on monomer (1.65% actual), 0.5% to 1.5% hydrogen peroxide, or organic peroxide continuously employed in polymerization reactions, catalyst based on monomer, balance water to make 100 parts.

The coke bottles were then capped using a hand-capping machine and then placed, shielded with wire screening, into an automatic shaking machine consisting of a large metal box equipped with a hinged door and heating coils. The temperature is controlled by a Celect Ray Indicating Controller unit. This unit will hold up to sixteen Coca-Cola bottles. However, a maximum of six bottle polymerization were run at one time.

The temperature was held at approximately 50° C. for a period of 4 hours. At the end of this time, the bottles were allowed to cool and then opened by piercing the cap using a special sharp-pointed tool inserted into a drill press. The piercing was effected by lowering the drill head containing the special tool until it had penetrated the cap thus releasing any built-up pressure.

Table 1

| Emulsifier (5% based on monomer) | Catalyst | Percent catalyst based on monomer | Conversion in 4 hours | General appearance of emulsion |
|---|---|---|---|---|
| Nonyl phenoxy polyethyleneoxy phosphate, sodium salt $[C_6H_4(OCH_2CH_2)_6-O-P(=O)(ONa)]_2$, $C_9H_{19}$ | Potassium persulfate | 0.5 | Ca. 100% | Excellent emulsion. |
| Nonyl phenoxy polyethyleneoxy phosphate, sodium salt $[C_6H_4(OCH_2CH_2)_4-O-P(=O)(ONa)]_2$, $C_9H_{19}$ | do | 1.5 | do | Do. |
| Dinonyl phenoxy polyethyleneoxy phosphate, sodium salt $[C_6H_3(C_9H_{19})(OCH_2CH_2)_7-O-P(=O)(ONa)]_2$, $C_9H_{19}$ | Potassium | 1.5 | do | Do. |
| Octyl phenoxy polyethyleneoxy sulfate, sodium salt | Potassium persulfate | 0.5 | do | Good emulsion. Flocculation on bottom. |
| Alpha sulfonated iso-octyl polyetheyleneoxy laurate, sodium salt $CH_3(CH_2)_9CH(SO_3Na)COO(CH_2CH_2O)_3C_8H_{17}$ | do | 0.5 | do | Do. |
| Lauryl polyethyleneoxy phosphate, potassium salt $[CH_3(CH_2)_{11}(OCH_2CH_2)_4-O-P(=O)(OK)]_2$ | do | 1.5 | do | Excellent. Stable emulsion. |
| Sodium oauryl sulfate | do | 1.5 | Coagulated | Approximately 90% coagulation. |
| Nonyl phenoxy polyethyleneoxy ethanol | do | 1.5 | do | Do. |
| Control (blank) | do | 1.5 | do | Approximately 100% coagulation. |
| Sodium lauryl sulfate | 30% hydrogen peroxide | 0.9 | Ca. 7% | Poor emulsion. Separated into 2 layers. |
| Nonyl phenoxy polyethyleneoxy ethanol | do | 0.9 | Ca. 5.5% | Do. |
| Octyl phenoxy polyethyleneoxy sulfate, sodium salt | do | 0.9 | do | Do. |
| Alpha sulfonated iso-octyl polyethyleneoxy laurate, sodium salt $CH_3(CH_2)_9CH(SO_3Na)COO(CH_2CH_2O)_3C_8H_{17}$ | do | 0.9 | Ca. 12.5% | Fair, white emulsion. Flocculation on bottom. |
| Nonyl phenoxy polyethyleneoxy phosphate, sodium salt $[C_6H_4(OCH_2CH_2)_4-O-P(=O)(ONa)]_2$, $C_9H_{19}$ | do | 0.9 | Ca. 88.5% | Excellent. Stable emulsion. |
| Nonyl phenoxy polyethyleneoxy phosphate, sodium salt $[C_6H_4(OCH_2CH_2)_6-O-P(=O)(ONa)]_2$, $C_9H_{19}$ | do | 0.9 | Ca. 89% | Do. |
| Control (blank) no emulsifier | do | 0.9 | | Poor emulsion. Separated into 2 layers. |

The resulting emulsions were then removed and placed in suitable containers.

Conversion of the monomer to polymer was determined by weighing out 5 grams of the emulsion on to a watch glass and placing on a steam plate overnight.

The results of these tests are shown in Table 1.

From the foregoing table it can be readily seen that the phosphate esters, based on percent conversion and emulsion stability, are excellent emulsifiers for polymerization of vinyl monomers. This is particularly true of percent conversion with the peroxide catalyst where only the phosphate esters gave appreciable conversions. All of the emulsions containing phosphate esters produced solid stable polymers. This was determined by exposing cast films at 100° C. in an electric oven for periods of up to six weeks and by placing similar specimens in a Fadeometer for periods of one hour to one week.

In addition, it was found that the peroxide catalyst polymerizations were stable to heat and light, and accordingly, therefore, the improved conversion using the phosphate esters is advantageous for producing heat stable polymers.

EXAMPLE II

Ten separate batches of a copolymer of butadiene with styrene were prepared according to the following formula:

| Ingredients: | Parts by weight—at 41° F. |
|---|---|
| Butadiene | 72.0 |
| Styrene | 28.0 |
| Tertiary dodecyl mercaptan (Sulfole B-8) | 0.15–0.30 |
| Emulsifier | Varied |
| Cumene hydroperoxide | 0.05–0.13 |
| Ferrous sulfate heptahydrate | 0.12 |
| Potassium pyrophosphate | 0.17 |
| Dextrose | 1.0 |
| Water | 180 |

The effects of variation in conversion and stability of the copolymer were noted with each particular emulsifier employed and the results observed. The following Table 2 lists the various emulsifiers, concentration thereof together with the conversion rate and the appearance of the latex.

Table 2

| Emulsifier | Parts per 100 parts monomer | Percent conversion of monomer by weight per hour at 41° F. | Stability of polymer dispersion, i. e. latex |
|---|---|---|---|
| Nonyl phenoxy phosphate diester-potassium salt. | 5 | 0 | Emulsifier not soluble. |
| Nonyl phenoxy polyoxyethylene (mole ratio—4) phosphate diester-potassium salt. | 5 | 4 | Excellent. |
| Nonyl phenoxy polyoxyethylene (mole ratio—6) phosphate diester-potassium salt. | 5 | 6.0 | Do. |
| Nonyl phenoxy polyoxyethylene (mole ratio—9) phosphate diester-potassium salt. | 5 | 5.5 | Do. |
| Nonyl phenoxy polyoxyethylene ethanol (mole ratio—4). | 5 | 0 | Emulsifier not soluble, i. e. phase separation. |
| Nonyl phenoxy polyoxyethylene ethanol (mole ratio—9). | 5 | 1.5 | O. K. |
| Nonyl phenoxy polyoxyethylene ethanol (mole ratio—15). | 5 | 2.9 | Viscous. |
| Nonyl phenoxy polyoxyethylene ethanol (mole ratio—20). | 5 | 2.6 | Slight prefloc. |
| Nonyl phenoxy polyoxyethylene ethanol (mole ratio—30). | 5 | 2.9 | Viscous. |
| Nonyl phenoxy polyoxyethylene sulfate-sodium salt (mole ratio—4). | 5 | 5.1 | Prefloc. |
| Isopropyl naphthalene sulfonfate-sodium salt. | 5 | 4.1 | Heavy prefloc. |

EXAMPLE III

Example I was repeated with the exception that vinyl acetate was replaced by an equivalent amount of the mixture comprising ethyl acrylate, 80%, and methyl acrylate, 20%, by weight. Conversion rate, latex stability and resin color stability comparisons were comparable to the results obtained in Example I.

EXAMPLE IV

Example I was again repeated with the exception that vinyl acetate was replaced by an equivalent amount of the mixture comprising methyl methacrylate, 85%, and ethyl acrylate, 15%. Conversion rate, latex stability and resin color stability comparisons were comparable to the results obtained in Example I.

EXAMPLE V

Example II was repeated with the exception that the 72 parts of butadiene and 28 parts of styrene were replaced by 66.7 parts of butadiene and 33.3 parts of acrylonitrile. The results with respect to conversion, latex stability, light stability by the Fadeometer test and the oven test were approximately the same as in Example II.

EXAMPLE VI

Example II was again repeated with the exception that the monomer mixture was replaced by an equivalent amount of styrene. Conversion rate, latex stability and resin color stability comparisons were comparable to the results obtained in Example II.

I claim:

1. The process of producing aqueous emulsion polymerizates of at least one polymerizable compound of the group consisting of a conjugated diolefin and a compound containing a single >C=C< group which comprises effecting the polymerization in an aqueous medium containing an emulsifying agent selected from the class consisting of the following formulae:

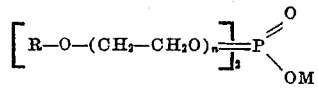

and

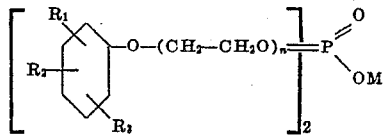

wherein R represents an alkyl radical containing from 8 to 27 carbon atoms, $R_1$ represents a member selected from the class consisting of alkyl and cycloalkyl of 5 to 27 carbon atoms, $R_2$ and $R_3$ represent a member selected from the class consisting of hydrogen, alkyl of from 8 to 27 carbon atoms and cycloalkyl of 5 to 10 carbon atoms, M represents an anion selected from the class consisting of alkali metals and ammonium, and $n$ represents the degree of oxyethylenation ranging from 1 to 40.

2. The process according to claim 1 wherein the emulsifying agent has the following formula:

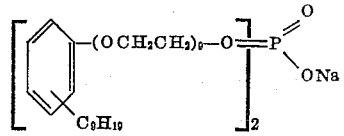

3. The process according to claim 1 wherein the emulsifying agent has the following formula:

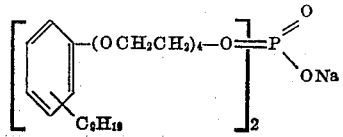

4. The process according to claim 1 wherein the emulsifying agent has the following formula:

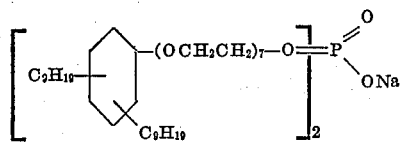

5. The process according to claim 1 wherein the emulsifying agent has the following formula:

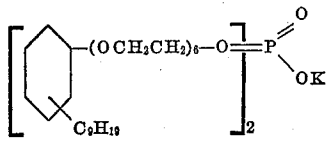

6. The process according to claim 1 wherein the emulsifying agent has the following formula:

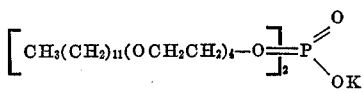

References Cited in the file of this patent
UNITED STATES PATENTS

| | | |
|---|---|---|
| 2,587,340 | Lewis et al. | Feb. 26, 1952 |
| 2,754,280 | Brown et al. | July 10, 1956 |

OTHER REFERENCES

Bennett: Concise Chem. and Tech. Dictionary, 1947, page 543, Chemical Publishing Co., Brooklyn, N. Y. (Copy in Scientific Library.)